United States Patent
Alameh et al.

(10) Patent No.: US 11,050,869 B1
(45) Date of Patent: Jun. 29, 2021

(54) PRIVACY-BASED USER BEHAVIOR MODIFICATION

(71) Applicant: Motorola mobility LLC, Chicago, IL (US)

(72) Inventors: Rachid Alameh, Chicago, IL (US); Zhengping Ji, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/665,864

(22) Filed: Oct. 28, 2019

(51) Int. Cl.
*H04B 1/38* (2015.01)
*H04M 1/60* (2006.01)
*G05B 15/02* (2006.01)
*H04M 1/02* (2006.01)
*H04M 1/72454* (2021.01)

(52) U.S. Cl.
CPC ............ *H04M 1/605* (2013.01); *G05B 15/02* (2013.01); *H04M 1/0216* (2013.01); *H04M 1/72454* (2021.01); *H04M 2250/74* (2013.01)

(58) Field of Classification Search
CPC ............... H04M 1/605; H04M 1/0216; H04M 1/72569; H04M 2250/74; G05B 15/02
USPC ........................................................ 455/563
See application file for complete search history.

(56) References Cited

U.S. PATENT DOCUMENTS

| | | | | |
|---|---|---|---|---|
| 6,104,808 A | * | 8/2000 | Alameh | H04M 1/0214 379/433.02 |
| 7,961,900 B2 | * | 6/2011 | Zurek | H04M 1/605 381/354 |
| 10,015,310 B2 | * | 7/2018 | Haikin | H04M 3/205 |
| 10,420,031 B2 | * | 9/2019 | Alameh | H04W 52/0254 |
| 10,432,779 B2 | * | 10/2019 | Agrawal | H04M 1/72454 |
| 2004/0001588 A1 | * | 1/2004 | Hairston | H04M 1/271 379/419 |
| 2013/0078962 A1 | * | 3/2013 | Clarke | H04M 1/72454 455/414.1 |
| 2013/0120106 A1 | * | 5/2013 | Cauwels | A61B 5/024 340/3.1 |
| 2013/0120459 A1 | * | 5/2013 | Dickinson | G04C 3/002 345/650 |
| 2016/0248894 A1 | * | 8/2016 | Hosoi | H04M 1/2757 |
| 2019/0200175 A1 | * | 6/2019 | Ylonen | H04W 4/10 |

OTHER PUBLICATIONS

Anders, George, "Alexa, Understand Me", Technology Review; Published online Aug. 9, 2017 at https://www.technologyreview.com/2017/08/09/149815/alexa-understand-me/ ; Viewed online Apr. 20, 2021.

* cited by examiner

*Primary Examiner* — April G Gonzales

(57) ABSTRACT

Systems and methods of implementing privacy-based user behavior modification in a mobile electronic communications device entail receiving a spoken user request at the mobile electronic communications device, determining a request privacy level and an environmental privacy level at the mobile electronic communications device, the environmental privacy level being one of private and non-private. The device then maintains communication privacy based on the request privacy level and the environmental privacy level.

20 Claims, 5 Drawing Sheets

PRIVACY-BASED USER BEHAVIOR MODIFICATION

TECHNICAL FIELD

The present disclosure is related generally to mobile electronic communications devices and, more particularly, to systems and methods for modifying user behavior based on privacy requirements in a mobile electronic communications device.

BACKGROUND

While the cellular phone was initially created to allow voice communications, it quickly grew into a device capable of handling entertainment tasks, financial transactions, social interactions and many other activities. As users interacted more frequently with their devices, user interface modalities were continually upgraded to keep up with the changes. For example, hardware push buttons gave way to virtual buttons displayed on the screen, and now even virtual buttons may be supplanted by voice interaction routines for most purposes.

However, voice interactions do not provide an ideal user interface modality. In particular, voice interactions are hampered by a number of concerns, including privacy and convenience. For example, voice assistant devices and routines today typically use loudspeakers and far-field microphones.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, voice interactions are useful for when users are trying to obtain information via their cellular device. However, existing voice interaction systems suffer from privacy issues, since such systems typically use loudspeakers and far-field microphones.

In overview, a wearable device such as a communications-enabled watch or other device analyzes user audio engagement with it, executes voice interpretation, assesses a user request or question, and analyzes background information such as environmental factors to determine whether a private or public setting is appropriate. The device then determines whether or not to alter user behavior before engaging to assure the determined privacy level. For example, if the is making a private inquiry from the wearable, e.g., a check account balance query, the wearable may assess a level of privacy from voice and background analysis and, if privacy is required, ask user to move closer (alter user interface/behavior) and/or adjusts volume levels accordingly before conveying the requested information to eth user.

Once determined, wearable then makes a determination whether or not to alter user behavior before engaging to assure privacy of communication. If user is making a private inquiry from wearable such as check account balance, wearable before conveying info to user assesses level of privacy from voice and background analysis and if privacy is determined to be required based on on-going assessment, device will ask user to move closer or alter voice levels (alter user interface/behavior) and adjusts volume levels accordingly.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
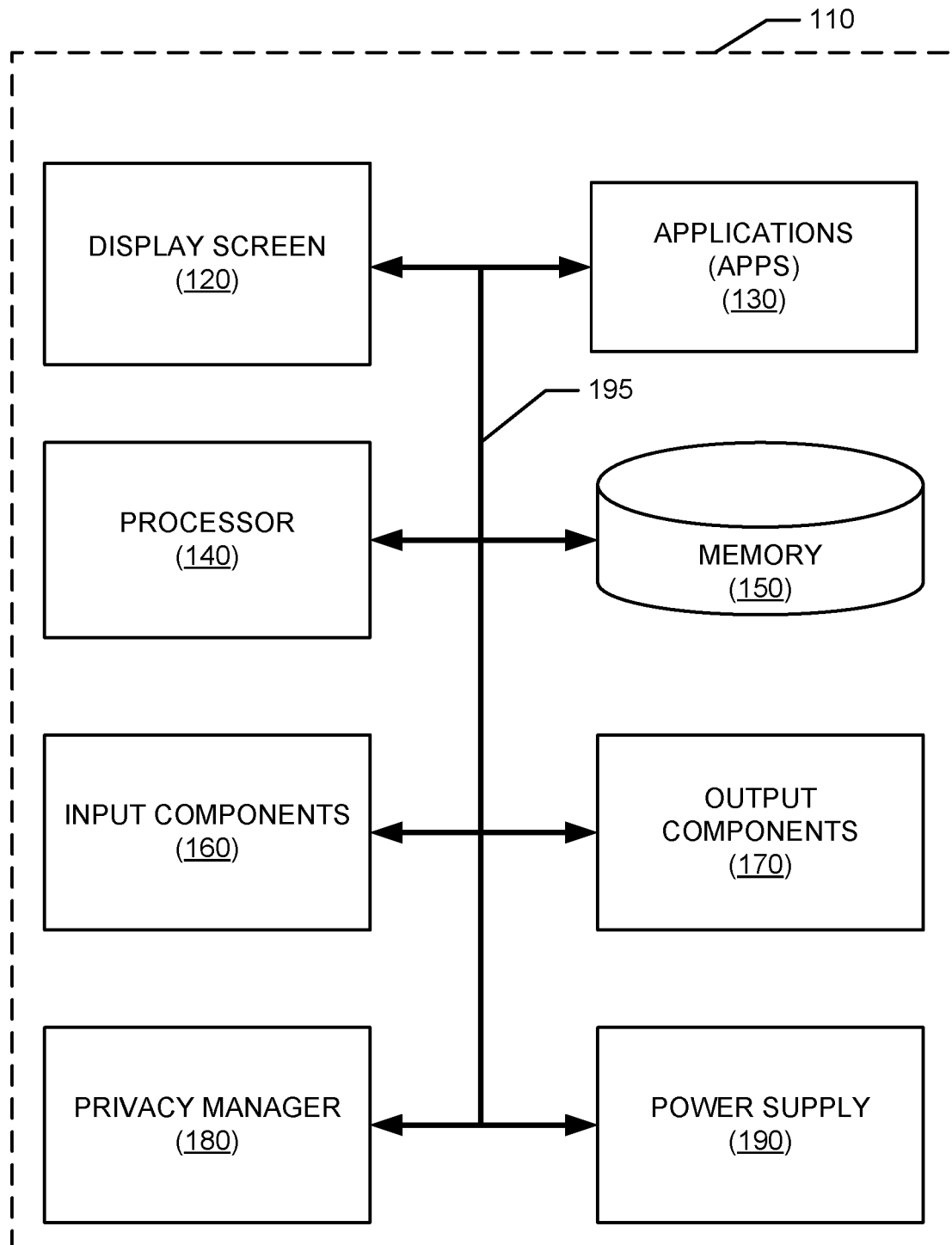
FIG. 1 is a general schematic representation of a mobile electronic device in which various embodiments of the disclosed principles may be implemented.

Thus, for example, while FIG. 1 is a simplified electrical schematic drawing illustrating components of an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, different generations of cellular service, e.g., 4G, 5G, etc.

The device 110 as illustrated also includes one or more output components 170 such as RF (radio frequency) or wired output facilities. The RF output facilities may similarly support any number of protocols, e.g., WiFi, Bluetooth, cellular including 5G, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation. In an embodiment, a privacy manager 180 executes functions associated with privacy assessment and privacy-based user behavior modification.

A power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

In an embodiment, the input 160 and output 170 components include one or more speakers, e.g., one or more earpiece speakers and one or more loudspeakers, as well as one or more microphones. It will be appreciated that these components may be built into the device 110, or alternatively, some or all may be separate from the device 110.

Figure 2:
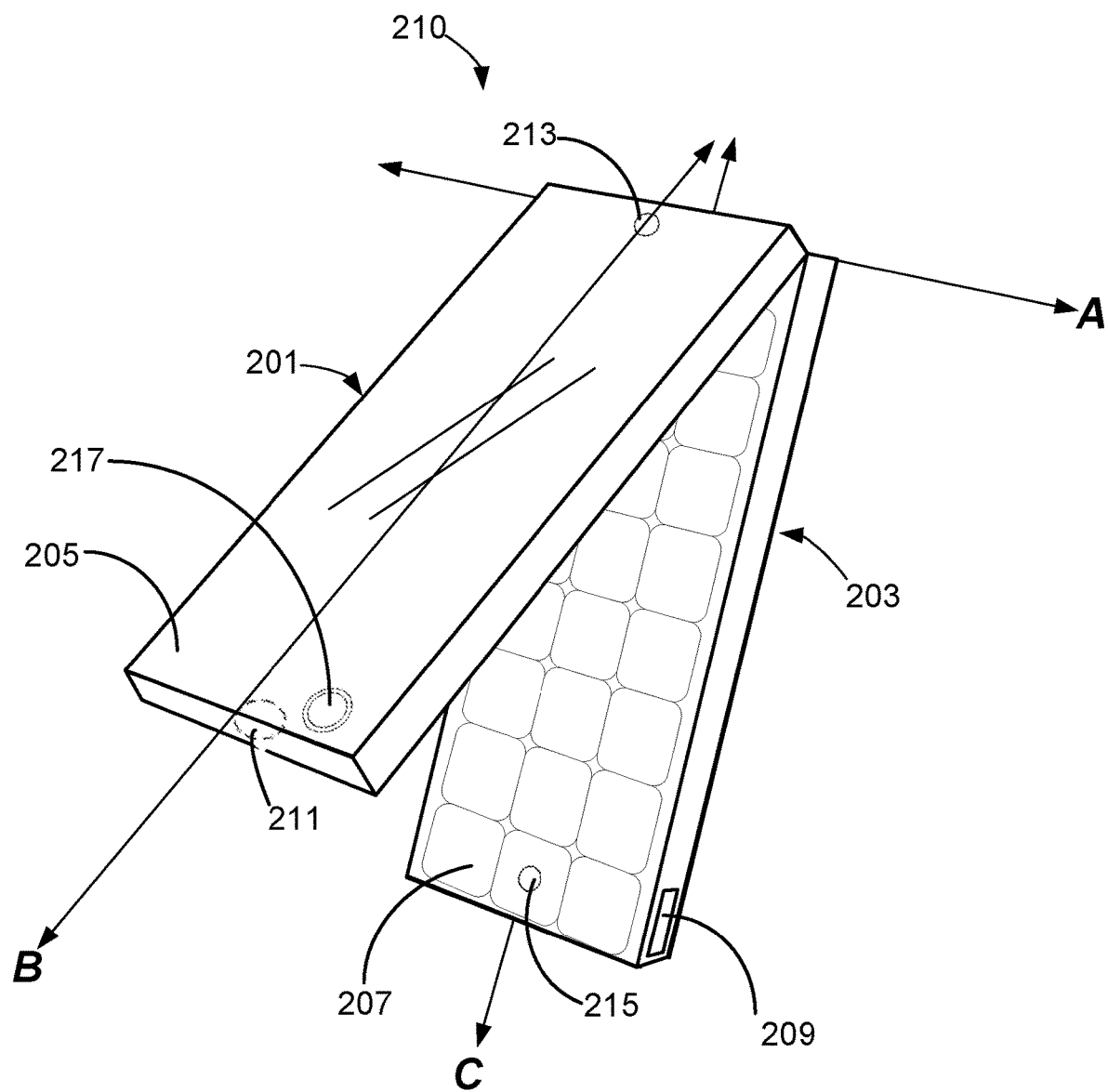
FIG. 2 is a simplified side view of a mobile electronic device such as that described with respect to FIG. 1, usable in various embodiments of the disclosed principles.

Turning to FIG. 2, this figure shows a simplified side view of a flip-type device 210 within which various embodiments of the disclosed principles may be implemented. As can be seen, the device 210 includes a first part 201 hinged to a second part 203. Although there is no requirement as to the features of each part 201, 203, in the illustrated embodiment, the first part 201 may include a display screen 205, while the second part 203 may include one or more physical keys 207 or another display screen. It will be appreciated that the display screen 205 of the first part 201 may also implement selectable keys, e.g., as touch sensitive displayed keys.

The device 210 as illustrated also includes a loudspeaker 209, which is a speaker configured to transmit sound audible from a distance, e.g., within several feet of the device 210. The device 210 also includes an earpiece speaker 211 which is placed so as to be adjacent to the user's ear when the device 210 is flipped open and is held to the user's head, e.g., during a phone call. The earpiece speaker 211 is configured to transmit sound that is clearly audible only from a very close range, e.g., within 12 inches.

One or more mics 213, 215 are also included, with one the mic 213 being usable while the device 210 is closed and the other mic 215 being usable while the device 210 is open. The second mic 215 is located so as to be adjacent the user's mouth when the device 210 is flipped open and is held to the user's head, e.g., during a phone call. Although not implicated in the present description, a camera 217 is also shown for reader context.

The primary longitudinal axis of the first part 201 is labelled by the identifier B while the primary longitudinal axis of the second part 203 is labelled by the identifier C. In operation of the device 210, the device 210 may be open (e.g., the first part 201 rotated until it is essentially parallel and end-to-end with the second part 203 and axes B and C are collinear) or closed (e.g., with the first part 201 closed against the second part 203 such that the keys 207, earpiece speaker 211 and mic 215 are not visible to, nor usable by, the user, and axes B and C are parallel but not collinear). In FIG. 2, the device 210 is shown partially open to illustrate the location and axis A of the hinge between parts 201 and 203.

It will be appreciated that in the open state of the device 210, the first part 201 may not be precisely parallel with the second part 203, e.g., the first and second parts 201, 203 may meet at substantially more than or less than 180°. As such, the open state of the device 210 may be understood as the state in which the device cannot open substantially further without damage or strain. Similarly, in the closed state, whether or not the parts 201, 203 are precisely parallel, the device 210 cannot be closed substantially further without damage or strain.

Figure 3:
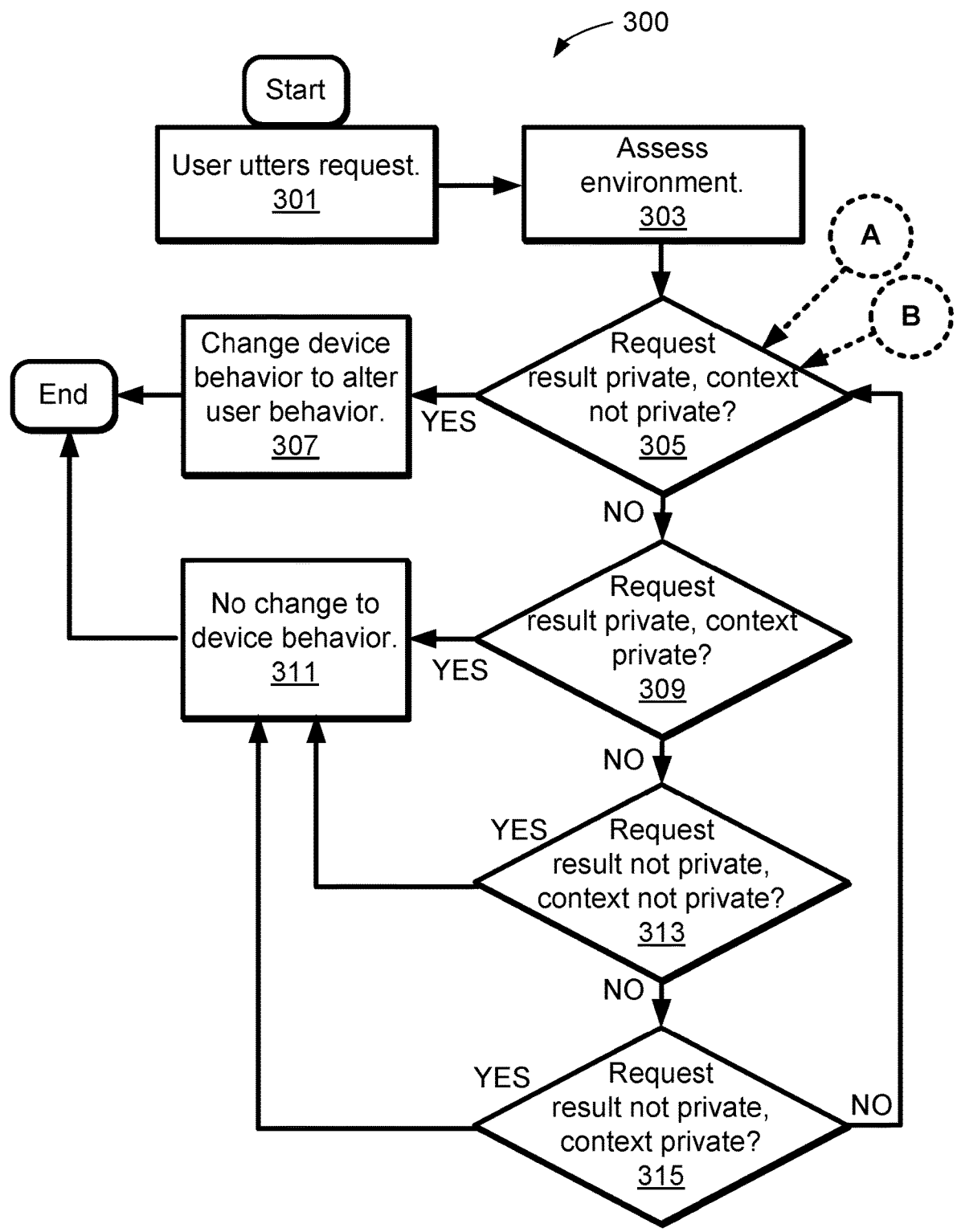
FIG. 3 is a flow chart showing a process of privacy management in accordance with an embodiment of the disclosed principles.
Figure 4:
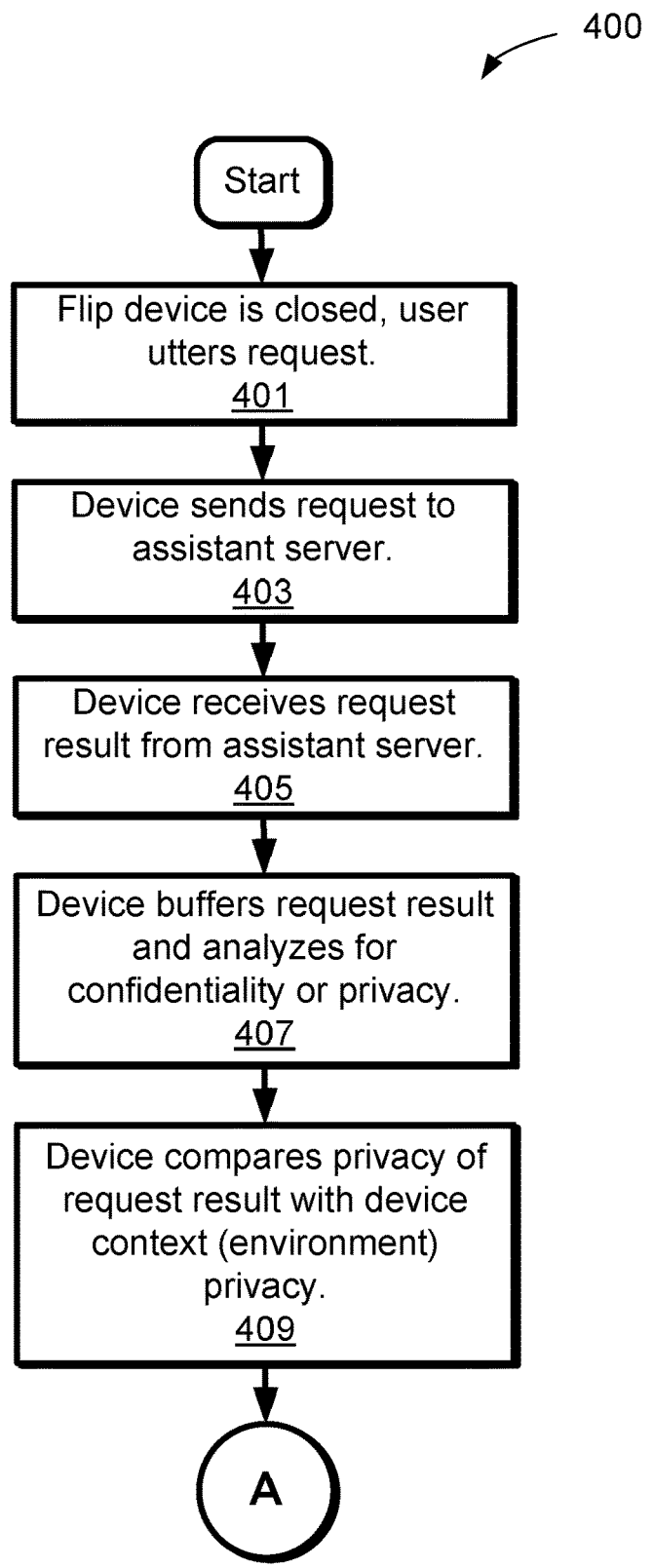
FIG. 4 is a flow chart showing a process of privacy management in accordance with an embodiment of the disclosed principles within a context of assistant-based information retrieval.

FIGS. 3 and 4 include flowcharts showing methods of privacy management in accordance with embodiments of the disclosed principles. Referring first to FIG. 3, this figure is a flow chart showing a process of privacy management in accordance with an embodiment of the disclosed principles. The illustrated process 300 starts at stage 301 wherein the wearable device receives a request from the user. From stage 301, the process flows to stage 303, wherein the wearable device analyzes the ambient background (others present, background noisy, etc.) and user audio engagement (user close and quiet, user further and louder, etc.), and conducts voice interpretation to assigns a character (private or non-private) to the request result. For example, the weather is public information whereas a bank account balance is private information At stage 305, if the request result has been determined to be private and the environment has been determined non-private, the process 300 is routed to stage 307, wherein the device alters its behavior to alter the user's behavior to assure privacy of communication. This alteration of device behavior may include one or both of (1) lowering speaker volume, thus forcing the user to come closer, and (2) displaying or uttering a request for the user to come closer to the device. If higher security is required, e.g., where moving closer and speaking at a lower volume is not sufficient, the device may request, audibly or via a screen, to defer responding until the context becomes more private. In an embodiment, the user is instructed to go to another location.

If instead one of the conditions analyzed at stage 305 fails (that is, either the request has been determined to be non-private or the environment has been determined to be private), the process 300 flows through stages 309 (request result has been determined to be private, environment has been determined to be private), 313 (request result has been determined to be non-private, environment has been determined to be non-private) and 315 (request result has been determined to be non-private, environment has been determined to be non-private) until a match is found, after which the process flows to stage 311.

At stage 311, the device behavior is left unaltered. Although a negative result at stage 305 could also feed directly to stage 311, the additional stages are included not as required steps but to show the variety of conditions that may lead to stage the device behavior remaining unaltered.

It will be appreciated that a given device, wearable or otherwise, may include more than one path for voice assistance. For example, consider a mobile phone that is a flip-open device such as the device 210 shown in FIG. 2. A device-based path such as that discussed with respect to FIG. 3 may apply when the device is open (private speaker enabled). However, an alternate assistant-based path (e.g., via ALEXA/GOOGLE) may apply when the device is closed (loudspeaker enabled). In this latter mode, the device may carry the appropriate process (e.g., Alexa/Google) to process user voice utterances when, for example, "Alexa" or "OK Google" is uttered. The results are then buffered by the device for processing based on content privacy assessment before being passed to the user. In this situation, background settings may determine whether the setting is private or non-private.

An example of the handling of such a situation is shown in the process 400 of FIG. 4. In particular, FIG. 4 is a flow chart showing a process of privacy management in accordance with an embodiment of the disclosed principles within a context of assistant-based information retrieval. At stage 401 of the process 400, while the flip device is closed, the user utters request. The device then sends the request to an assistant server associated with the assistant (e.g., an Alexa server).

The device receives the request result from the assistant server at stage 405 and buffers the request result at stage 407 to analyze the result for confidentiality or privacy. For example, if the result is a bank account balance or medical diagnosis, the result may be considered private (confidential), whereas if the result is a stock report or weather forecast, the result may be considered non-private. At stage 409, the device compares the privacy of the request result with privacy evidenced in the device context (environment), and moves forward to stage 305 of the process 300 (FIG. 3) via entry pint "A". From there, as discussed above by reference to FIG. 3, device behavior is altered or not altered based on the two privacy levels (request result and environment).

Figure 5:
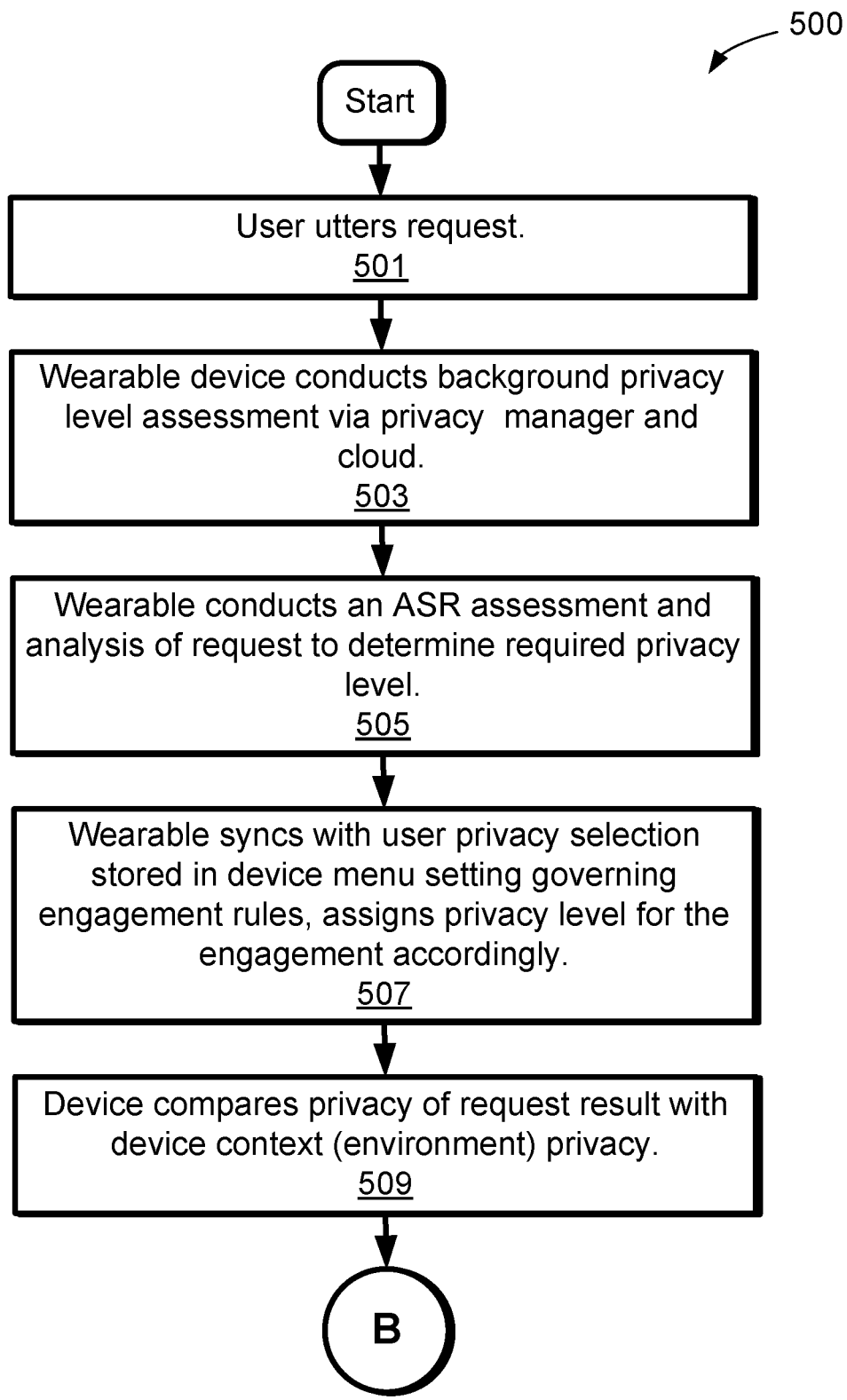
FIG. 5 is a flow chart showing an example of user privacy-based behavior modification instruction in accordance with an embodiment of the disclosed principles.

FIG. 5 shows a flow chart of a process 500 that provides a more detailed view of potential initial steps prior to determining whether device or user behavior is to be altered to meet privacy requirements. At stage 501 of the process 500, the user utters a request. The wearable device conducts a background privacy level assessment via the privacy manager 180 in conjunction with internet resources at stage 503. The wearable also conducts an ASR assessment and analysis of the request at stage 505 to determine a required privacy level.

The wearable then syncs with a user privacy selection stored in a device menu setting governing engagement rules, and assigns a privacy level for the engagement accordingly at stage 507. Finally, at stage 509, the device compares the privacy of the request result with the privacy determined based on device context (environment) and moves forward to stage 305 of the process 300 (FIG. 3) via entry pint "B". From there, as discussed above by reference to FIG. 3, device behavior is altered or not altered based on the two privacy levels (request result and environment).

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile electronic communications device implementing privacy-based user behavior modification, the device comprising:
    at least one microphone;
    a loudspeaker configured to project sound that is audible and understandable when a user's ear is not adjacent the loudspeaker;
    a private speaker configured to project sound that is audible only when the user's ear is adjacent the private speaker;
    a processor linked to the microphone, the loudspeaker and the private speaker, configured to receive a user request, conduct an environment privacy level assessment to generate an environmental privacy level, conduct an ASR assessment and analysis of the request to determine a request privacy level, retrieve a user privacy selection, and control device behavior based on the environmental privacy level, request privacy level and user privacy selection.

2. The mobile electronic communications device in accordance with claim 1, wherein the environmental privacy level is one of private and non-private and the request privacy level is also one of private and non-private.

3. The mobile electronic communications device in accordance with claim 2, wherein, the processor is configured to control device behavior to increase privacy when the environmental privacy level is non-private and the request privacy level is private unless the user privacy selection indicates otherwise.

4. The mobile electronic communications device in accordance with claim 2, wherein controlling device behavior to increase privacy includes instructing a user to move closer to the device.

5. The mobile electronic communications device in accordance with claim 2, wherein controlling device behavior to increase privacy includes adjusting audio interface volume.

6. The mobile electronic communications device in accordance with claim 2, wherein controlling device behavior to increase privacy includes requesting to defer request response play back.

7. The mobile electronic communications device in accordance with claim 2, wherein controlling device behavior to increase privacy includes requesting that a user move to another location.

8. The mobile electronic communications device in accordance with claim 1, wherein, the processor is configured to generate the environmental privacy level via one or more remote resources.

9. The mobile electronic communications device in accordance with claim 1, wherein the processor is configured to retrieve the user privacy selection from a device menu setting.

10. The mobile electronic communications device in accordance with claim 1, wherein the device is one of a wearable mobile communications device and a cellular telephone.

11. A mobile electronic communications device implementing privacy-based user behavior modification, the device comprising:
    a flip-open housing having an open state and a closed state;
    at least one microphone;
    a loudspeaker configured to project sound that is audible and understandable when a user's ear is not adjacent the loudspeaker;
    a private speaker configured to project sound that is audible only when the user's ear is adjacent the private speaker;
    a processor linked to the microphone, the loudspeaker and the private speaker, configured to receive a user request, conduct an environment privacy level assessment to generate an environmental privacy level, determine a request privacy level via a mechanism selected based on a state of the flip-open housing, and control device behavior based on the environmental privacy level and request privacy level;
    wherein determining the request privacy level via a mechanism selected based on the state of the flip-open housing comprises determining the request privacy level via a data assistant and associated data assistant server when the flip-open housing is in the closed state and otherwise determining the request privacy level via device-based resources.

12. The mobile electronic communications device in accordance with claim 11, wherein the environmental privacy level is one of private and non-private and the request privacy level is also one of private and non-private.

13. The mobile electronic communications device in accordance with claim 11, wherein controlling device behavior to increase privacy includes deferring responding to the user request until the environmental privacy level becomes private.

14. The mobile electronic communications device in accordance with claim 11, wherein controlling device behavior to increase privacy includes providing an instruction to move to another location.

15. The mobile electronic communications device in accordance with claim 11, wherein, the processor is configured to control device behavior to increase privacy when the environmental privacy level is non-private and the request privacy level is private unless a user privacy selection indicates otherwise.

16. The mobile electronic communications device in accordance with claim 11, wherein controlling device behavior to increase privacy includes instructing a user to move closer to the device.

17. The mobile electronic communications device in accordance with claim 11, wherein controlling device behavior to increase privacy includes adjusting audio interface volume.

18. A method of implementing privacy-based user behavior modification in a mobile electronic communications device, the method comprising:
    receiving a spoken user request at the mobile electronic communications device;
    determining a request privacy level, the request privacy level being one of private and non-private;
    receiving environmental data regarding environmental factors at the mobile electronic communications device;
    determining an environmental privacy level at the mobile electronic communications device, the environmental privacy level being one of private and non-private; and
    controlling device behavior to maintain privacy based on the request privacy level and the environmental privacy level;
    wherein the mobile electronic communications device is a flip phone having a device state that is one of open and closed, and wherein determining a request privacy level includes determining the request privacy level via a data assistant using a data assistant server if the device state is closed.

19. The method in accordance with claim 18, wherein the mobile electronic communications device is one of a wearable device and a cellular telephone.

20. The method in accordance with claim 18, wherein when the environmental privacy level is one of private or non-private, wherein controlling the device behavior to maintain the privacy comprises leaving the device behavior unaltered when the environmental privacy level is private.

* * * * *